US007542469B2

(12) United States Patent
Owens et al.

(10) Patent No.: US 7,542,469 B2
(45) Date of Patent: *Jun. 2, 2009

(54) SYSTEM AND METHOD FOR REMOTELY COMMUNICATING WITH A BROADBAND MODEM

(75) Inventors: Craig Braswell Owens, San Carlos, CA (US); Thomas Obenhuber, San Francisco, CA (US); Steven L. Herrick, Fremont, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 294 days.

This patent is subject to a terminal disclaimer.

(21) Appl. No.: 11/430,507

(22) Filed: May 9, 2006

(65) Prior Publication Data
US 2006/0203810 A1 Sep. 14, 2006

Related U.S. Application Data

(63) Continuation of application No. 09/960,569, filed on Sep. 20, 2001, now Pat. No. 7,088,708.

(51) Int. Cl.
*H04L 12/28* (2006.01)
*H04L 12/56* (2006.01)

(52) U.S. Cl. .................................................. 370/389

(58) Field of Classification Search ................. 370/355, 370/389, 401, 244, 252, 471, 428, 402, 525, 370/352, 354; 379/102, 90.01, 93.01, 88.17; 709/220, 201; 348/14; 715/716, 727, 719; 725/32, 109; 375/222, 231, 229, 220, 295, 375/211

See application file for complete search history.

(56) References Cited

U.S. PATENT DOCUMENTS

| 5,913,041 | A  | * | 6/1999  | Ramanathan et al. | 709/233 |
|-----------|----|---|---------|-------------------|---------|
| 6,330,597 | B2 | * | 12/2001 | Collin et al.     | 709/220 |
| 6,408,280 | B1 | * | 6/2002  | Astarabadi        | 705/26  |
| 6,636,505 | B1 | * | 10/2003 | Wang et al.       | 370/352 |
| 6,798,769 | B1 | * | 9/2004  | Farmwald          | 370/352 |
| 6,829,234 | B1 | * | 12/2004 | Kaplan et al.     | 370/352 |
| 7,079,527 | B2 | * | 7/2006  | Owens             | 370/352 |
| 7,088,708 | B2 | * | 8/2006  | Owens et al.      | 370/355 |
| 2002/0186833 | A1 | * | 12/2002 | Lucas          | 379/361 |
| 2003/0037292 | A1 | * | 2/2003  | Bullman et al. | 714/43  |
| 2004/0064570 | A1 | * | 4/2004  | Tock           | 709/228 |

* cited by examiner

*Primary Examiner*—Wing F Chan
*Assistant Examiner*—Prenell P Jones

(57) ABSTRACT

A method for remotely communicating with a Broadband modem is provided. Once a communication error is detected on a Broadband modem, a Plain Old Telephone System (POTS) connection is established between the Broadband modem and a remote server. Communication then occurs with the remote server via the POTS connection using Dual-Tone Multi-Frequency (DTMF) tones. The communication preferably comprises transmitting information associated with the communication error to the remote server via the POTS connection using DTMF tones and receiving a diagnosis from the remote server via the POTS connection in DTMF tones. A system for remotely diagnosing a Broadband modem as well as a Broadband modem is also provided.

47 Claims, 5 Drawing Sheets

SYSTEM AND METHOD FOR REMOTELY COMMUNICATING WITH A BROADBAND MODEM

This application is a continuation of U.S. patent application Ser. No. 09/960,569, entitled "SYSTEM AND METHOD FOR REMOTELY COMMUNICATING WITH A BROADBAND MODEM," filed Sep. 20, 2001 now U.S. Pat. No. 7,088,708, by Craig Braswell Owens, Thomas Obenhuber, and Steven L. Herrick, which is hereby incorporated by reference herein.

The present invention relates generally to Broadband telecommunications. More specifically, the present invention relates to an alternative system and method for communicating with a Broadband modem.

BACKGROUND OF THE INVENTION

While high-speed or Broadband Internet connections to large businesses have been in existence for some time, Broadband Internet connections to homes and small businesses have only recently become more commonplace. Broadband technologies such as ISDN (Integrated Services Digital Network), cable modems, satellite, and DSL (Digital Subscriber Line), are all competing for market share. The two technologies at the forefront, DSL and cable, offer much faster Internet access than dial-up modems, for a cost substantially lower than ISDN.

Analog modems over regular telephone lines are not fast enough for today's Broadband multi-media content. In fact, so-called 56 Kbps modems actually move data at approximately 44 Kbps because of telephone-line imperfections. Furthermore, these modems only reach that speed when receiving data, not sending it.

Basic ISDN transfers data at 56 Kbps, while an improved form of ISDN has a maximum speed of 128 Kbps. ISDN is, however, expensive, running up to several hundreds of dollars a month. Furthermore, ISDN is only approximately four times the speed of a 33.6 Kbps modem.

Another option, satellite, which uses the same type of mini-dish antenna typical of broadcast television can receive data at up to 400 Kbps. However, transmitted data still has to be sent through a traditional analog modem at 33.6 Kbps or 56 Kbps.

Cable modems, enable one to hook up a computer to a local cable television line and receive data at about 1.5 Mbps. This data rate far exceeds that of both 56 Kbps analog modems, and the 128 Kbps of ISDN. The actual bandwidth for Internet service over a cable TV line is up to 27 Mbps for receiving data, and up to about 2.5 Mbps of bandwidth for transmitting data. However, since the local provider may not be connected to the Internet on a line faster than a T1 at 1.5 Mbps, a more likely data rate will be closer to 1.5 Mbps. Cable, however, suffers the drawback that it is carried on existing cable television lines, which not all homes, and especially not all small businesses are equipped with. Furthermore, available bandwidth is shared with other cable users in the same geographic area.

DSL, on the other hand, is 20 times faster than satellite connections, 60 times faster than ISDN, and 250 times faster than 33.6 Kbps analog modems. DSL or xDSL, as used herein, refers to different variations of DSL, such as ADSL (Asymmetric Digital Subscriber Line), HDSL (High bit-rate Digital Subscriber Line), and RADSL (Rate Adaptive Digital Subscriber Line). Assuming that the location of one's home or business is close enough to a telephone company central office (CO) that offers DSL service, one can receive data at rates up to 6.1 megabits (millions of bits) per second. More typically, individual connections will provide from 1.544 Mbps to 512 Kbps downstream and about 128 Kbps upstream. Best of all, those bits are transmitted via the same copper wire, otherwise known as a twisted pair, one uses for telephone calls, but without the complex setup of ISDN. DSL does this by taking advantage of unused frequencies that exist on standard telephone lines. An added advantage is that the original POTS (Plain Old Telephone Service) frequencies remain free to handle voice traffic over the same twisted pair. Yet another advantage is that unlike cable modems, DSL users do not share their Broadband connections with others in the same geographical area.

However, not all twisted pairs can support DSL service. The quality of different twisted pairs vary according to geographic region, age, gauge, and the distance from the CO. Speed of transmission slows with an increase in distance between the customer premises and the CO.

Furthermore, bridged taps and splices, which are unconnected copper cable between the customer premises and the CO (the result of anticipating customer needs for future expansion or the result of re-assigning copper once routed to one customer to be used by another customer) may also prevent the transmission of DSL signals.

In addition, load coils will prevent the transmission of high-frequency DSL signals within a loop. Load coils were deployed to improve the voice quality of loops greater than 18,000 feet. Still further, Digital Loop Carriers (DLCs) were designed in the early 1970s to combine multiple voice channels (as many as 24 voice lines) into a single T1 transport line. They provided an economical and quick way of adding additional voice lines for remote customers. DLCs use digital techniques similar to those used by DSL equipment. Since the bandwidth of the copper pair is already in use by the DLC equipment, DSL will perform at a greatly reduced rate, if at all, depending on the volume of voice calls and the type of DLC equipment. Connecting DSL equipment to DLCs can also adversely affect the performance of the voice-based system.

Moreover, line noise from adjacent copper cable can affect the performance of DSL service. A number of contributing factors, including cable shielding, unbalanced lines, and the presence of adjacent T1 circuits, can cause line noise. In turn, line noise can affect the error rates of data transmission, resulting in decreased transmission speeds for DSL equipment.

All of these factors affect the ability of the existing infrastructure to carry DSL signals. Depending on local conditions, some of these impediments may make DSL service impossible.

The primary participants in provisioning the DSL service are the DSL Internet Service Provider (ISP), and the local telephone provider, i.e., the telephone company that owns the twisted pair running to the user. Typically, the request for service is initiated from the user to the DSL ISP. The DSL ISP then requests the local telephone provider to provision a line from the local telephone provider to the user.

Once a local telephone provider has ascertained that DSL service can be provisioned over the user's existing twisted pair, a twisted pair is connected between the customer premises and to the CO, through a Digital Subscriber Line Access Multiplexer (DSLAM). The local telephone provider normally has a DSLAM installed in the local telephone provider's CO prior to provisioning the user's twisted pair. The DSLAM is then connected to the DSL network through a router. In most cases a technician is then sent out to set up and install a DSL modem at the user premises.

Recent developments have all but eliminated the need for sending a technician to the user to set up and install the DSL modem. These developments allow the user to merely connect the modem to the provisioned twisted pair and a power source, and then turn the modem on. The modem then establishes a DSL circuit and automatically configures itself with important network information from the ISP, such as an Internet Protocol (IP) address. Further details of such automatic configuration can be found in U.S. patent application Ser. No. 09/668,623, which is incorporated herein by reference.

However, there are instances where a DSL circuit cannot be provisioned at all. For example, where the user has not connected the DSL modem to the correct twisted pair, where the local telephone company has not properly provisioned the twisted pair, where the ISP fails to transmit the network information to the DSL modem, or the like.

In these situations the user usually either refers to a user manual or contacts the DSL ISP's customer support. This results in aggrieved customers and expensive customer support centers. Where the user or a customer support representative cannot diagnose the problem, a technician must be sent to the user premises to set up and install the modem. It has been estimated, that a typical service call to set up a DSL modem, currently costs in the region of $300 for the DSL ISP.

Therefore, a need exists for a system and method for communicating with a Broadband modem that does not require the use of a preexisting Broadband circuit. Furthermore, a system and method for remotely diagnosing the Broadband modem would also be highly desirable.

SUMMARY OF THE INVENTION

According to the invention there is provided a method for remotely communicating with a Broadband modem. Once a communication error is detected on a Broadband modem, a Plain Old Telephone System (POTS) connection is established between the Broadband modem and a remote server. Communication then occurs with the remote server via the POTS connection using Dual-Tone Multi-Frequency (DTMF) tones. The communication preferably comprises transmitting information associated with the communication error to the remote server via the POTS connection using DTMF tones and receiving a diagnosis from the remote server via the POTS connection in DTMF tones.

Further according to the invention there is provided a system for remotely diagnosing a Broadband modem. The system includes a telephone company central office coupled to both a data network and a Public Switched Telephone Network (PSTN). The system further includes a Broadband modem coupled to the telephone company central office via a telephone line. The Broadband modem is configured to communicate data and Dual-Tone Multi-Frequency (DTMF) tones over the telephone line. In addition, the system includes a remote server coupled to the PSTN, where the remote server is configured to communicate with the Broadband modem using DTMF tones.

Still further, according to the invention there is provided a Broadband modem. The broadband modem includes a Central Processing Unit (CPU), communications circuitry, and a DTMF transceiver. The Broadband modem includes a memory having Broadband communication procedures, DTMF transceiver procedures, and a DTMF protocol. In addition, the Broadband modem the includes a bus connecting the aforesaid components.

The above can be used to help debug configuration errors that prevent the modem from communicating through the Broadband connection to other configuration services, thereby eliminating or reducing the number of calls the user must make to customer support.

BRIEF DESCRIPTION OF THE DRAWINGS

Additional objects and features of the invention will be more readily apparent from the following detailed description and appended claims when taken in conjunction with the drawings, in which:

Like reference numerals refer to corresponding parts throughout the several views of the drawings.

DESCRIPTION OF THE PREFERRED EMBODIMENTS

For ease of explanation the following description and drawings represent a DSL system. It should, however, be clear to those skilled in the art that the present invention may be embodied in any Broadband system without departing from the spirit and scope of the present invention as defined in the accompanying claims. The Broadband system is any high speed communication system.

Figure 1:
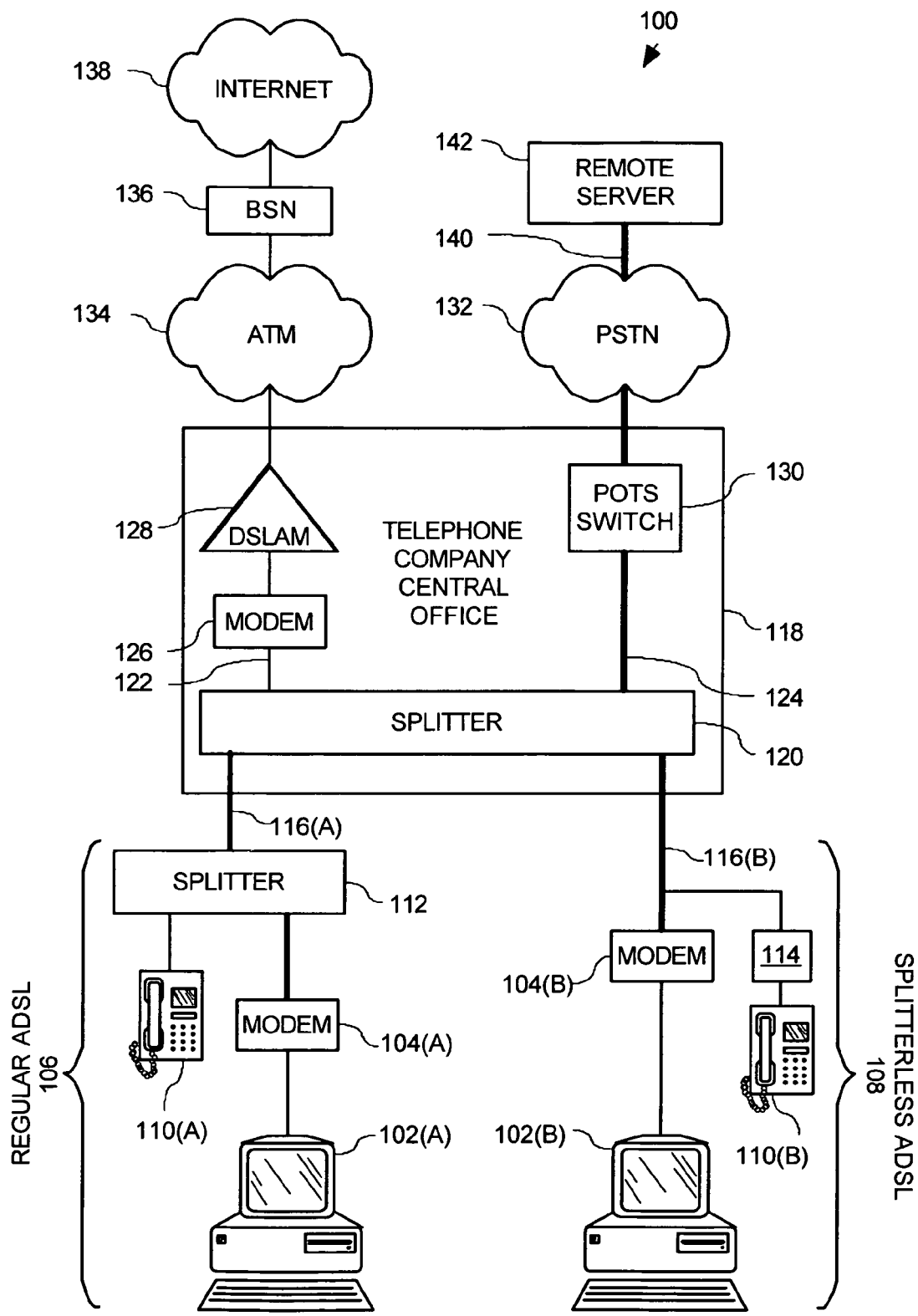
FIG. 1 is a diagrammatic view of the system architecture according to an embodiment of the invention.

FIG. 1 is a diagrammatic view of the system architecture 100 according to an embodiment of the invention. Traditional telephone services, otherwise known as Plain Old Telephone Systems (POTS) allow telephone users to communicate with one another over a Public Switched Telephone Network (PSTN). Typically, copper telephone wires 116 (A) or 116 (B), also known as twisted pairs, connect analog input devices (POTS devices) 110(A) or 110(B), such as telephone sets, to a telephone company central office (CO) 118. The CO 118 in turn connects to the PSTN 132 to allow telephone calls to be placed between geographically dispersed POTS devices.

The POTS devices 110 take an acoustic signal (which is a natural analog signal) and convert it into an electrical equivalent in terms of volume (signal amplitude) and pitch (frequency of wave change). Because analog transmission only uses a small portion of the available amount of information that can be transmitted over copper wires, the maximum amount of data that can be communicated using analog signals is about 56 Kbps.

A remote server 142 is coupled to the PSTN 132, preferably over a T1 line 140, which is a 1.544 Mbps point-to-point dedicated, digital circuit. The remote server 142 is also preferably operated by the DSL ISP.

DSL does not convert the digital data into analog form and back again, allowing the telephone company to use a much wider bandwidth for transmission. DSL allows the signal to be separated so that some of the bandwidth is used to transmit an analog signal, such that use of a telephone and computer on the same line, and at the same time, can occur simultaneously.

There are two main types of DSL systems used today, namely regular ADSL 106 and splitterless ADSL 108. Asymmetric DSL (ADSL) is for Internet access, where fast downstream is required, but slow upstream is acceptable. Symmetric DSL (SDSL, HDSL, etc.) is designed for short haul connections that require high speed in both directions. Unlike ISDN, which is also digital but travels through the switched telephone network, DSL provides "always-on" operation.

Asymmetric DSL shares the same line as the telephone, because it uses higher frequencies than the voice band. However, a POTS splitter 112 must be installed on the customer's premises to separate the line between voice and data. Splitterless ADSL, also known as G.lite, Universal ADSL, or ADSL Lite, is geared to the consumer by eliminating the splitter and associated installation charge. All telephones on the telephone line must, however, plug into low-pass filters to isolate them from the higher ADSL frequencies.

The twisted pairs 116 (A) or 116(B) connect to a telephone company's central office 118, currently, up to 18,000 feet (approximately 5.5 Km) away. A splitter 120, at the telephone company's central office 118, separates voice calls 124 from data 122. Voice calls 124 are routed by a POTS switch 130 to the PSTN 132, and thereafter are switched to their destination.

Regular ADSL 106 transmits data 122 from a client computer 102(A) to a Broadband modem 104(A), otherwise known as a Gateway, hereafter "DSL modem". A splitter 112 then differentiates between voice and data. Voice travels on the first 4 kHz of frequency, while the higher frequencies, up to 2 MHz depending on line conditions and wire thickness, are used for data. Once the splitter 112 has differentiated between voice and data, the data are then transmitted to the telephone company's central office 118 over the twisted pair 116(A).

Splitterless ADSL 108 transmits data 122 from a client computer 102(B) to a Broadband modem 104(B), hereafter "DSL modem". The DSL modem then sends the data signal to the telephone company's central office 118 over the twisted pair 116(B). The analog input device 110(B) connects to the CO 118 via a micro filter 114.

Once the data signal is received at the telephone company's central office 118, a splitter 120 directs the data signal 122 to another Broadband modem 126, hereafter "DSL modem". The DSL modem 126 then transmits the data signal 122 to a Digital Subscriber Line Access Multiplexer (DSLAM) 128. The DSLAM 108 links multiple DSL modems through a single high-speed asynchronous transfer mode (ATM) network 134 to a Broadband Service Node (BSN) 136. An ATM network is a dedicated-connection switching technology that organizes digital data into 53-byte cells or packets and transmits them using digital signal technology. The BSN 136 allows service providers to aggregate tens of thousands of subscribers onto one platform and apply highly customized Internet Protocol (IP) services to these subscribers.

The BSN 136 then routes the data signal, at speeds up to 1 Gbps, over an IP network to the Internet 138. In a converse manner, data requested by the client computer 102(A) or 102(B) is retrieved from the Internet 138 and routed back through the DSLAM 128 and DSL modem 126 at the telephone company's central office 118 before arriving at the user's DSL modem 104.

Figure 2:
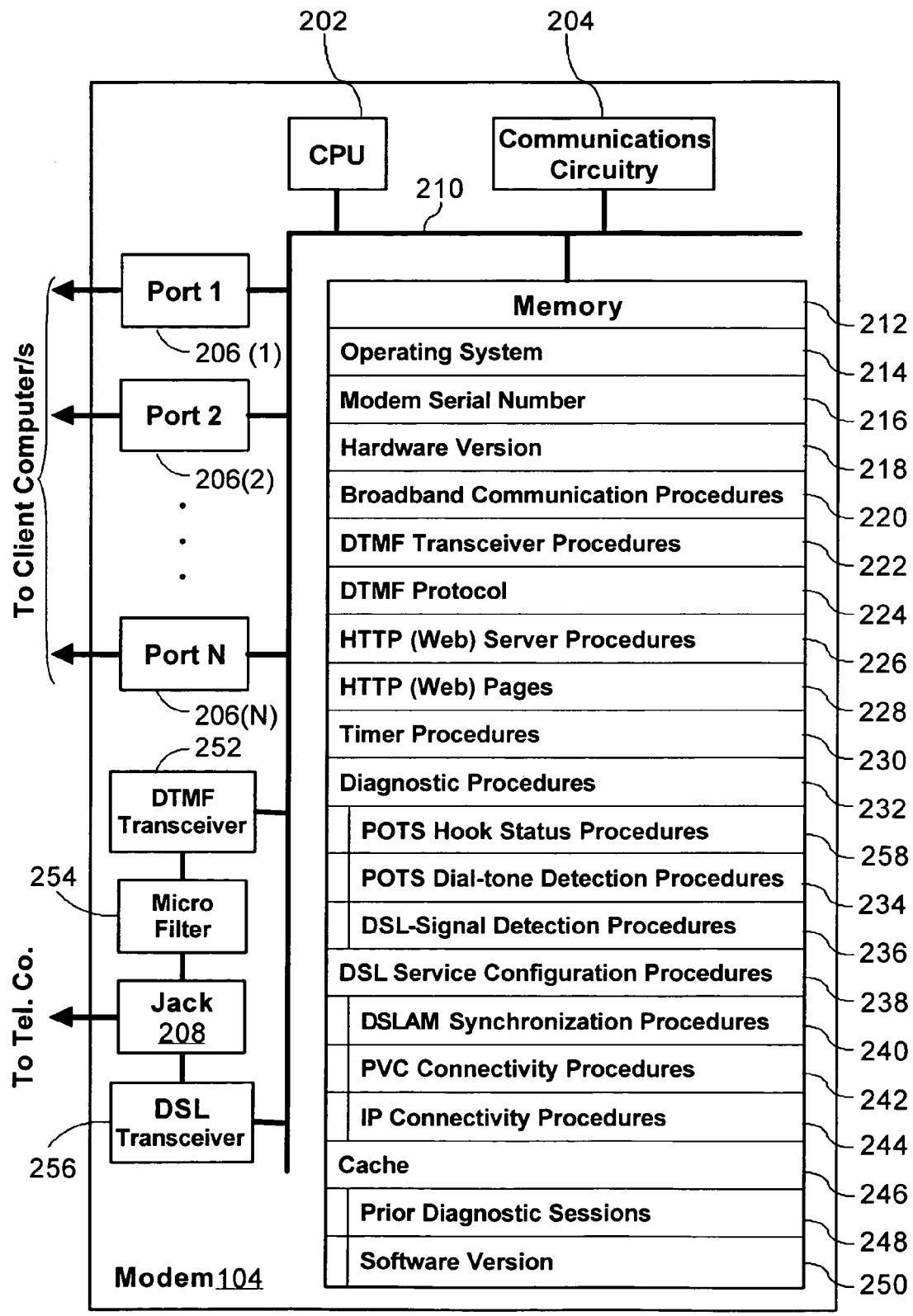
FIG. 2 is a block diagram of the DSL modem shown in FIG. 1.

FIG. 2 is a block diagram of the DSL modem 104 shown in FIG. 1. The DSL modem 104 comprises at least one data processor or central processing unit (CPU) 202, a memory 212, communications circuitry 204, communication ports 206(1)-(N), a communications jack 208, such as a RJ11 female telephone jack, a Dual-Tone Multi-Frequency (DTMF) transceiver 252 coupled through a micro-filter 254 to the communications jack 208, a DSL transceiver 256 also coupled to the communications jack 208, and at least one bus 210 that interconnects these components.

The communications circuitry 204 and/or communication ports 206(1)-(N) preferably include one or more Network Interface Cards (NICs) configured to communicate using Ethernet. Furthermore, the communications circuitry 204 and DTMF transceiver 252 that communicate with the PSTN preferably include a SILICON LABS Si3044 Direct Access Arrangement (DAA) connected directly to a MOTOROLA MPC85O via a Time Division Multiplexing (TDM) bus. A separate Digital Signal Processor (DSP) is preferably not included in the DSL modem 104. The DAA is the section of DSL modem hardware that connects to the POTS line 116 (FIG. 1) through the communications jack 208. The DAA is required in order to meet the safety requirements of the Federal Communications Commission (FCC). The DTMF transceiver 252 is also preferably capable of simultaneously sending and receiving five to ten DTMF tones per second.

The Si3044 is a DAA that offers global compliance through a programmable telephone line interface. A digital synchronous serial interface is provided to connect to a wide variety of DSPs and host processors. The chipset is fully programmable for AC and DC termination, ringer impedance and ringer threshold, and the device supports billing tone detection, polarity reversal, and pulse dialing enabling it to meet the most stringent global PTT requirements. The Si3044 offers a number of features, including line voltage monitoring (up to 72V in 2.25V/bit resolution), parallel phone operation, higher transmit/receive levels (up to +3.2 dBm), and lower telephone line current consumption in on-hook line monitor (caller ID) mode.

A Fast Fourier Transform (FFT) algorithm preferably runs on the MPC85O to perform DTMF reception. In a preferred embodiment, the DAA is connected through a micro-filter 254 to the inner pair of wires of a telephone line of a single RJ11 jack 208.

For splitterless ADSL, the user is not required to connect a separate POTS line to the DSL modem, i.e., only the single POTS line provisioned by the user's local telephone company for DSL service needs to be plugged into the communications jack 208.

Memory 212 preferably includes an operating system 214 (such as VXWORKS™, or EMBEDDED LINUX™), having instructions for communicating, processing, accessing, storing, or searching data, etc. Memory 212 also preferably includes a unique modem serial number 216 and the hardware version 218 for the DSL modem hardcoded into the memory 212. In addition, the memory 212 includes Broadband communication procedures 220; DTMF transceiver procedures 222, such as a FFT algorithm; a DTMF protocol 224; HTTP (Web) server procedures 226; HTTP (Web) Pages 228; timer procedures 230; diagnostic procedures 232; DSL service configuration procedures 238; and a cache 246.

Broadband communication procedures 220 are used for communicating with the client computers 102 (FIG. 1), modem 126 (FIG. 1), DSLAM 106 (FIG. 1), ATM network 134 (FIG. 1); BSNs 136 (FIG. 1), and the Internet 138 (FIG. 1).

The DTMF protocol 224 are the rules governing transmitting and receiving of data used to communicate with the remote server 142 (FIG. 1) over the PSTN 132 (FIG. 1). The DTMF protocol 224 uses DTMF, which is a multifrequency signaling system in which standard set combinations of two specific voice band frequencies, one from a group of four low frequencies and the other from a group of four higher frequencies, are used. The protocol preferably sends and receives DTMF tones at 5 to 10 DTMF tones per second. All communication is asynchronous in nature to simplify the protocol. All DTMF signals received are preferably acknowledged by a reply signal.

The HTTP (Web) server procedures 226 are used to serve the HTTP (Web) Pages 228. The timer procedures 230 are used to record the passage of time, while the diagnostic procedures 232 are used to diagnose communication errors, as explained in further detail below in relation to FIGS. 4A and 4B. The diagnostic procedures 232 include POTS hook status procedures 258 for detecting whether a POTS line is on or off-hook, POTS dial-tone detector procedures 234 for detecting the presence of a POTS dial-tone on the twisted pair 116 (FIG. 1), and DSL-signal detector procedures 236 for detecting the presence of a DSL-signal on the twisted pair 116 (FIG. 1). A POTS dial-tone is a regular telephone dial-tone as heard when lifting a receiver of a telephone handset.

The DSL service configuration procedures 238 are used to configure the DSL modem 104 to communicate over a Broadband circuit, hereafter "DSL circuit". More specifically, the configuration procedures 236 include DSLAM synchronization procedures 240; Permanent Virtual Circuit (PVC) connectivity procedures 242; and Internet Protocol (IP) connectivity procedures 244. The DSLAM synchronization procedures 240 are used to configure the DSL physical link of a DSL circuit. The PVC connectivity procedures 242 are used to configure a Permanent Virtual Circuit of the DSL circuit, as explained in further detail in U.S. patent application Ser. No. 09/668,623, which is incorporated herein by reference. The IP connectivity procedures 244 are used to configure the IP layer of a DSL circuit as is well understood in the art.

The cache 246 includes a temporary history of prior diagnostic sessions 248 with the remote server 142 (FIG. 1) and the current software version 250 of the software stored in the memory 212.

Figure 3:
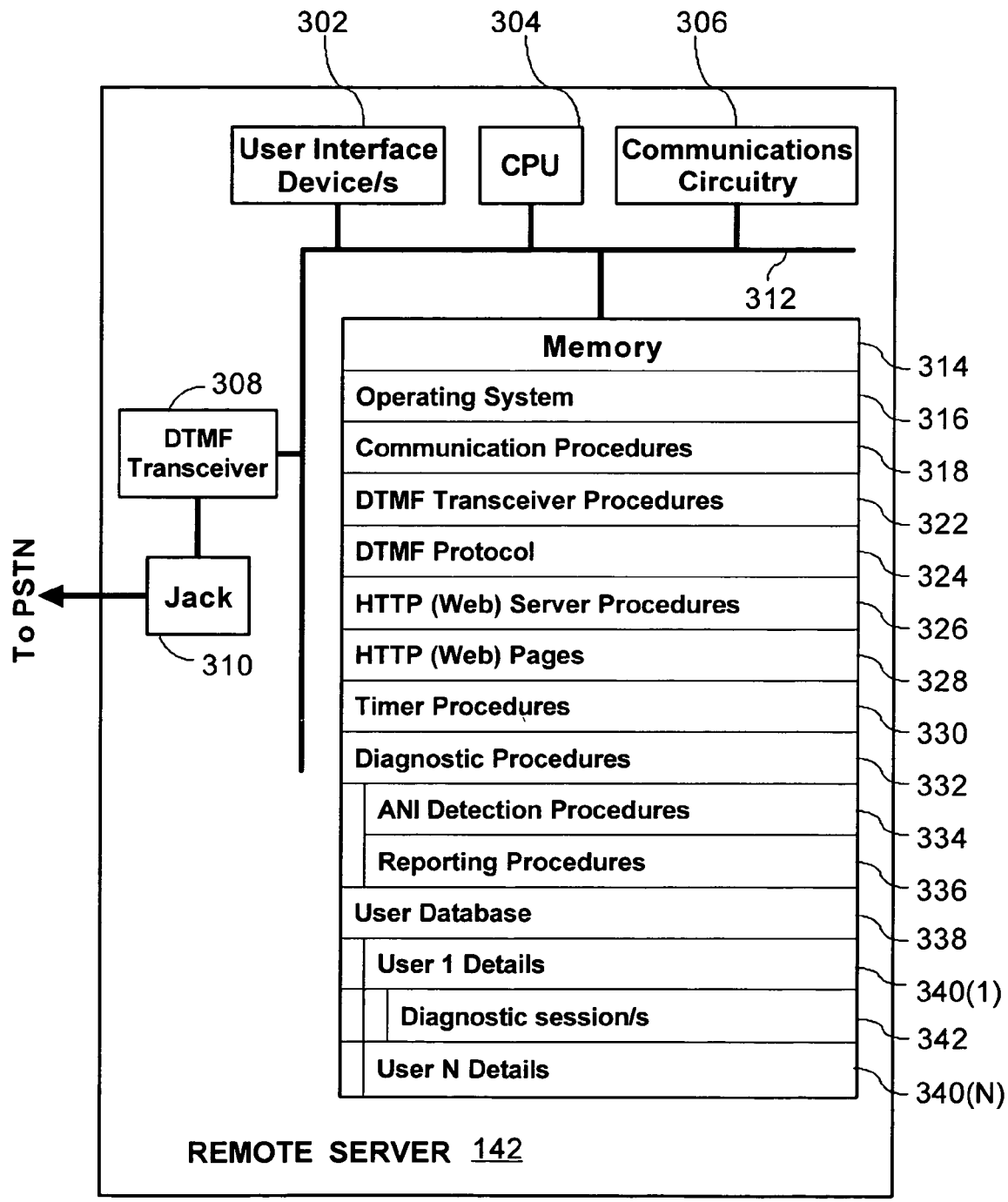
FIG. 3 is a block diagram of the remote server shown in FIG. 1.

FIG. 3 is a block diagram of the remote server 142 shown in FIG. 1. The remote server 142 also comprises at least one data processor or central processing unit (CPU) 304, a memory 314, communications circuitry 306, a DTMF transceiver 308, a communications jack 310, user interface devices 302, such as a keyboard and monitor, and at least one bus 312 that interconnects these components. The communications circuitry 306 preferably consists of one or more T1 cards, while the DTMF transceiver 308 is preferably capable of simultaneously sending and receiving five to ten DTMF tones per second on multiple lines simultaneously. In a preferred embodiment, two T1 lines would give fourty six lines operating simultaneously on one remote server.

Memory 314 preferably includes an operating system 316 (such as WINDOWS NT or LINUX), having instructions for communicating, processing, accessing, storing, or searching data, etc. Memory 314 also preferably includes communication procedures 318; DTMF transceiver procedures 322; a DTMF protocol 324; HTTP (Web) server procedures 326; HTTP (Web) Pages 328; timer procedures 330; diagnostic procedures 332; and a user database 338.

Communication procedures 318 are used for communicating with the DSL ISP's servers (not shown), such as configuration servers, authentication servers, or the like. The DTMF protocol 324 is used to communicate with the modem 104 (FIG. 1) over the PSTN 132 (FIG. 1) using DTMF, as described above. The HTTP (Web) server procedures 326 are used to serve the HTTP (Web) Pages 328. The timer procedures 336 are used to record the passage of time, as explained in further detail below in relation to FIGS. 4A and 4B.

The diagnostic procedures 332 are used to diagnose communication errors, as explained in further detail below in relation to FIGS. 4A and 4B. The diagnostic procedures 332 include Automatic Number Identification (ANI) detection procedures 334 and reporting procedures 336. The ANI detection procedures 334 are used for identifying the billing telephone number of an incoming call, while the reporting procedures 336 are used to report communication errors to the DSL ISP.

The user database 338 includes details 340(1) to (N) for each user, such as a user identifier, the telephone number of the telephone line for which DSL service was provisioned, etc. The user database 338 also includes a log of prior diagnostic sessions 344 for each user.

Figure 4A:
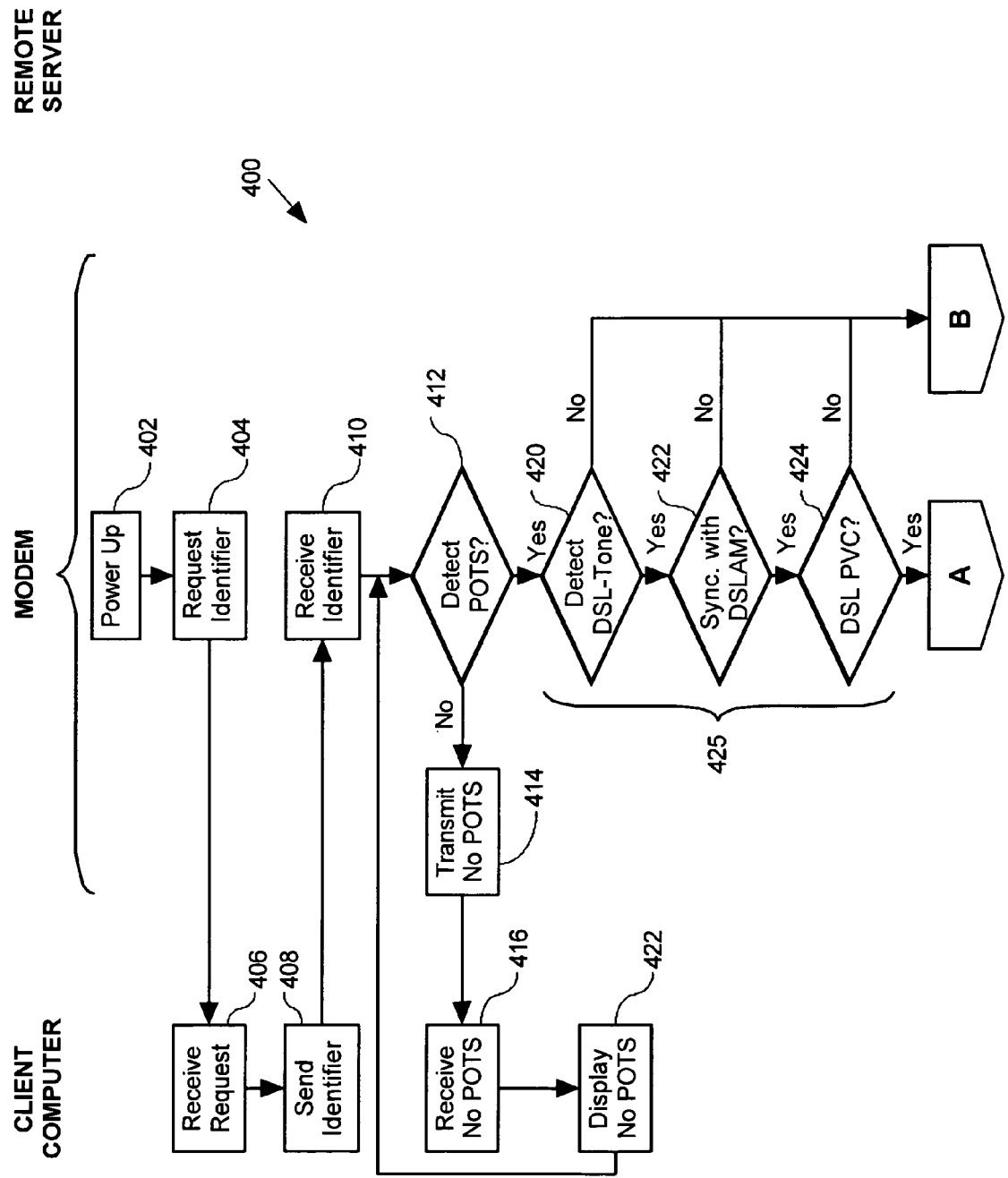
FIGS. 4A and 4B are a flow chart of a method of remotely communicating with a DSL modem.
Figure 4B:
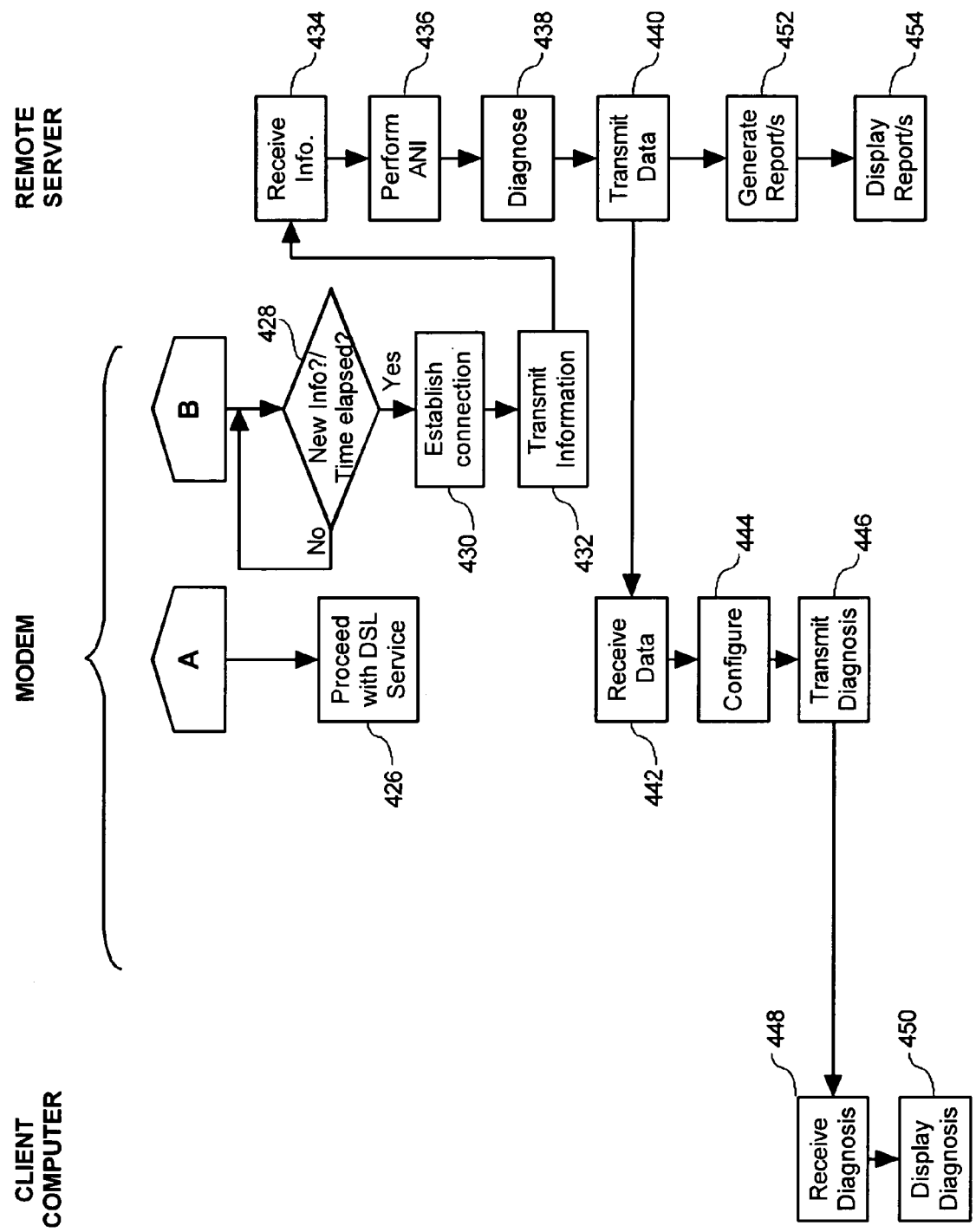

FIGS. 4A and 4B are a flow chart of a method 400 of remotely communicating with a DSL modem 104 (FIG. 1). Once the user has plugged a twisted pair into the communications jack 208 (Figure) and plugged the DSL modem into a power source, the DSL modem is powered up 402. If the user has also connected his/her client computer/s 102 (FIG. 1) into the ports 206 (FIG. 1) of the DSL modem, the DSL modem preferably requests 404 a user identifier from the user via the client computer. In a preferred embodiment the user identifier is the user's telephone number. Alternatively, the request 404 may occur at a later time during the method 400, or not at all.

The client computer receives 406 the request for a user identifier, and once the user has supplied his/her user identifier, sends 408 it back to the DSL modem, which receives 410 it and stores it in the cache 246 (FIG. 2).

All communication with the client computer is handled by the DSL service configuration procedures 238 (FIG. 2), using the HTTP (Web) server procedures 226 (FIG. 2) to serve a HTTP (Web) page 228 (FIG. 2) to the user via a HTTP (Web) browser on the client computer.

The POTS hook status procedures 258 and POTS dial-tone detection procedures 234 (FIG. 2) then attempt to detect 412 POTS service on the twisted pair. If no POTS service is detected (412—No), then a message is transmitted 414 to the client computer. This is performed using the HTTP (Web) server procedures 226 (FIG. 2) to serve a HTTP (Web) page 228 (FIG. 2 to the client computer. The message informs the user that no POTSservice was detected and the possible causes and remedies for this error, such as that the twisted pair is not plugged into the DSL modem and that the connection should be checked. The client computer receives 416 the no POTS service message and displays 422 it to the user. The DSL modem continues to attempt to detect 412 POTS service until one is detected.

If POTS service is detected (412—Yes), then the DSL-signal detection procedures 236 (FIG. 2) attempt to detect 420 a DSL-signal, which is an indicator that the twisted pair has been provisioned for DSL service.

If a DSL-signal is detected (420—Yes), then the DSLAM synchronization procedures 240 (FIG. 2) of the DSL service configuration procedures 238 (FIG. 2) attempt to synchronize 422 the DSL modem with the DSLAM 128 (FIG. 1).

If DSL synchronization (422—Yes) is successful, then the PVC connectivity procedures 242 (FIG. 2) attempt to establish 424 a Permanent Virtual Circuit (PVC) as is well understood in the art and described in U.S. patent application Ser. No. 09/668,623.

If a DSL PVC is established (424—Yes), then a DSL circuit can be established and DSL service can proceed 426 as usual. Proceeding with DSL service 426 may include configuring the DSL modem through the DSL circuit.

It should be appreciated that detecting a DSL-signal 420, detecting whether synchronization with the DSLAM can be established 422, and detecting whether a DSL PVC can be established 424, are merely examples of communication errors 425 that can be detected by the system. Any other communication error 425, such as failing to communicate with a configuration server or failing to establish IP connectivity, may also be detected. Failing to establish IP connectivity is detected by the IP connectivity procedures 242 (FIG. 2). If a communication error 425 occurs, then there is no need to proceed with the configuration setup since Broadband connectivity cannot be established.

If DSL-signal 420 is not detected (420—No), if the DSL modem cannot synchronize with the DSLAM (422—No), or if a DSL PVC cannot be established (424—No), then the timer procedures 230 (FIG. 2) and/or diagnostic procedures 232 (FIG. 2) determine 428 either whether any new communication errors have been detected since last reporting to the remote server, and whether a certain amount of time, such as ten minutes, have elapsed without rectifying the detected communication error. If no new communication errors have been detected, or a certain amount of time has not elapsed (428—No), then this determining step 428 is repeated until such time that it is satisfied.

A lack of DSL-signal can be attributed to many problems, such as the wrong phone line (twisted pair) is connected to the modem, there is no cross-connect at the CO, or any other wiring problem. Problems with DSLAM synchronization might be a wiring problems or line noise.

If a new communication error is detected, and a certain amount of time has elapsed (428—Yes), then the DTMF transceiver procedures 222 (FIG. 2) establish 430 a POTS connection with the remote server 142. This preferably involves dialing a random one of a number of toll free telephone numbers hardcoded into the DSL modem, where the toll free telephone numbers are associated with the remote server. Alternatively, the DSL modem dials a first toll free number to obtain a second toll free number for a specific modem serial number. The second toll free number is then dialed to establish the POTS communication with the remote server 142. The establishment 430 of a POTS connection occurs automatically without user intervention.

In an alternative embodiment, the detection 412 of the POTS service on the twisted pair, transmittal 414 to the client computer, receipt 416 by the client computer, and display 422 it to the user all occur only once it is determined that a new communication error is detected, and a certain amount of time has elapsed (428—Yes).

In a preferred embodiment, only one POTS connection is established by the DSL modem for each step of the setup that fails. For example, if the customer has no DSL-signal, a POTS connection is established. No further POTS connections will be made until the DSL-signal problem is resolved. When that happens, if the customer then has another configuration problem, such as a problem with DSL synchronization or PVC connectivity, the gateway establishes a second POTS connection, etc. In an alternative embodiment, the user can initiate a POTS connection from a HTTP (Web) page displayed in a browser on the client computer.

When establishing the POTS connection, the DSL modem does not dial unless all telephones connected to the twisted pair are on-hook and no ring signal is present. If a telephone goes off-hook at any time during the call, the gateway finishes its call and then goes back on-hook, rather than hanging up immediately. Alternatively, the POTS connection is terminated to go on-hook immediately. However, this would not give the customer a dial tone, and the typical length of such a POTS connection is only about 30 seconds long.

It should also be noted that the POTS connection may fail for a number of reasons, such as:

No Dial-tone
The DSL modem cannot call out if no dial tone is on the line, but it will display a message to the user on a status web page informing the user of the error.

POTS Line Busy
The DSL modem will not interrupt the user's POTS call. It will make its call to the remote server when the user hangs up.

User Interrupts DSL Modem's Call
The DSL modem will continue its call and hang up when finished. This takes less than 30 seconds.

DSL Modem Unable to Reach Remote Server
This may happen for many reasons, such as the remote server is busy, the remote server is down, or there is a problem with the PSTN. In this case, the DSL modem will implement a back-off algorithm so that it does not tie up the user's phone line (twisted pair). The DSL modem will preferably attempt a second call in one hour, a third call in six hours, a fourth call in 24 hours, and a fifth call in three days. If the fifth call does not go through, it will give up. The back-off algorithm is reset when the DSL modem is power cycled or when a particular failure condition is repaired.

Once the POTS connection has been established 430 between the DSL modem 104 (FIG. 1) and the remote server 142 (FIG. 1), they communicate with each another using the DTMF transceivers 208 (FIG. 2) and 308 (FIG. 3), DTMF transceiver procedures 222 (FIG. 2) and 322 (FIG. 3), and DTMF protocol 224 (FIG. 2) and 324 (FIG. 3).

The DSL modem then transmits 432 information to the remote server. This information may in its simplest form include a request for data, such as configuration data. However, in a preferred embodiment, the information includes information associated with the detected communication error 425. The information may include the modem's software version 250 (FIG. 2), hardware version 218 (FIG. 2), serial number 216 (FIG. 2), phone number entered by the user (if any), the DTMF Protocol version number; the highest configuration state that the DSL modem has achieved; DSL Upstream Speed; DSL Downstream Speed; DSL status, etc. The DSL status preferably includes: DSL-signal status; PVC status; "no line signal detected;" "signal detected from DSLAM;" "synchronized with DSLAM;" "received a packet over ATM layer;" "IP layer ping worked," etc. This information is subsequently received 434 by the remote server.

In a preferred embodiment, the remote server, using the ANI detection procedures 334 (FIG. 3), then performs ANI to determine the billing telephone number of the twisted pair from which the POTS connection was established 430. In a preferred embodiment, the diagnostic procedures 332 (FIG. 3) then attempt to diagnose 438 the cause of the communication error. For example, the ANI detected billing number may not be the same as the twisted pair that was configured for DSL service by the local telephone company (as stored in the user database 340 (FIG. 3) or obtained from the user 404-410). The diagnosis is then preferably date/time stamped and saved in the user database 340 (FIG. 3) as a diagnostic session 342 (FIG. 3).

Data, such as the diagnosis or configuration details, are then transmitted to the DSL modem, which receives 422 the data. If the data contains configuration details, the DSL modem configures 444 itself using the data. If the data contains a diagnosis, the diagnosis is preferably transmitted 446 to the client computer, which receives 448 the diagnosis, stores the diagnosis in a database (not shown), and displays 450 it to the user. The diagnosis displayed may instruct the user to try and rectify the problem, or if the cause of the communication error cannot be determined, or it is not possible for the user to correct the error, to call the ISP customer support.

The remote server, using the reporting procedures 336 (FIG. 3), may then generate 452 one or more reports which are displayed 454 to an ISP system administrator using the HTTP (Web) server procedures 326 (FIG. 3), HTTP (Web) pages 328 (FIG. 3) through the user interface device/s 302 (FIG. 3). These reports preferably list the communication errors, diagnostic sessions, users accessing the remote server, etc.

While the foregoing description and drawings represent the preferred embodiment of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description. Furthermore, it should be noted that the order in which the process is performed may vary without substantially altering the outcome of the process.

What is claimed is:

1. A method of remotely communicating with a Broadband modem, comprising:
   accepting a Plain Old Telephone System (POTS) connection initiated by the Broadband modem in a remote server; and
   accepting a communication from the Broadband modem over the POTS connection, the communication describing a broadband communication error detected when a Broadband circuit cannot be provisioned over a twisted pair connected to the Broadband modem.

2. The method of claim 1, wherein the communication is expressed in Dual-Tone Multi-Frequency (DTMF) tones.

3. The method of claim 1, further comprising the step of transmitting a diagnosis from the remote server to the Broadband modem.

4. The method of claim 3, wherein the diagnosis is expressed in Dual-Tone Multi-Frequency (DTMF) tones.

5. The method of claim 4, wherein the diagnosis is transmitted to a client computer.

6. The method of claim 5, wherein the diagnosis is transmitted in the form of a Web-page from a Web-server of the Broadband modem to a Web-browser of the client computer.

7. The method of claim 1, wherein the communications error is detected when a Digital Subscriber Line (DSL) tone does not exist on the twisted pair.

8. The method of claim 1, wherein the communications error is detected when the Broadband modem cannot synchronize with a Digital Subscriber Line Access Multiplexor (DSLAM).

9. The method of claim 1, wherein the communications error is detected when a Permanent Virtual Circuit (PVC) cannot be established from the Broadband modem.

10. The method of claim 1, wherein the communication comprises information associated with the communication error selected from the group consisting of:
    a serial number of the Broadband modem;
    a hardware version of the Broadband modem;
    a software version of the Broadband modem;
    an identifier acquired from a user of the Broadband modem;
    Digital Subscriber Line (DSL) tone information;
    Digital Subscriber Line Access Multiplexor (DSLAM) connectivity information;
    Virtual Circuit connectivity information;
    Internet Protocol (IP) connectivity information; and
    any combination of the foregoing.

11. The method of claim 1, further comprising:
    receiving a request for Broadband modem configuration information from the Broadband modem; and
    transmitting the Broadband modem configuration information to the Broadband modem.

12. A method of remotely communicating with a broadband modem, comprising the steps of:
    accepting a communication from the Broadband modem via a Plain Old Telephone System (POTS) connection, the communication describing a broadband communication error detected when a Broadband circuit cannot be provisioned with the Broadband modem; and
    transmitting a diagnosis from the remote server to the Broadband modem.

13. The method of claim 12, wherein the POTS connection is initiated by the Broadband modem.

14. The method of claim 12, wherein the communication error is detected by the Broadband modem.

15. The method of claim 12, wherein the communication is expressed in Dual-Tone Multi-Frequency (DTMF) tones.

16. The method of claim 12, further comprising the step of transmitting a diagnosis from the remote server to the Broadband modem.

17. The method of claim 12, wherein the diagnosis is expressed in Dual-Tone Multi-Frequency (DTIVJF) tones.

18. The method of claim 12, wherein the diagnosis is transmitted to a client computer.

19. The method of claim 12, wherein the diagnosis is transmitted in the form of a Web-page from a Web-server of the Broadband modem to a Web-browser of the client computer.

20. The method of claim 12, wherein the communications error is detected when a Digital Subscriber Line (DSL) tone does not exist on the twisted pair.

21. The method of claim 12, wherein the communications error is detected when the Broadband modem cannot synchronize with a Digital Subscriber Line Access Multiplexor (DSLAM).

22. The method of claim 12, wherein the communications error is detected when a Permanent Virtual Circuit (PVC) cannot be established from the Broadband modem.

23. The method of claim 12, wherein the communication comprises information associated with the communication error selected from the group consisting of:
    a serial number of the Broadband modem;
    a hardware version of the Broadband modem;
    a software version of the Broadband modem;
    an identifier acquired from a user of the Broadband modem;
    Digital Subscriber Line (DSL) tone information;
    Digital Subscriber Line Access Multiplexor (DSLAM) connectivity information;
    Virtual Circuit connectivity information;
    Internet Protocol (IP) connectivity information; and
    any combination of the foregoing.

24. A method for remotely communicating with a Broadband modem, comprising:
    detecting a communication error on a Broadband modem comprising detecting that a Broadband circuit cannot be provisioned over a twisted pair connected to said Broadband modem;

establishing a Plain Old Telephone System (POTS) connection between said Broadband modem and a remote server; and communicating with said remote server via said POTS connection.

25. The method of claim 24, wherein said communicating comprises:

transmitting information associated with said communication error to said remote sever via said POTS connection; and receiving a diagnosis from said remote server via said POTS connection.

26. The method of claim 25, wherein the information associated with the communication error is transmitted using DTMF tones and the diagnosis is received in DTMF tones.

27. The method of claim 25, further comprising transmitting said diagnosis to a client computer.

28. The method of claim 27, wherein said transmitting comprises communicating diagnosis information in the form of a Web-page from a Web-server on the Broadband modem to a client computer's Web-browser.

29. The method of claim 24, wherein said detecting step comprises detecting that a Digital Subscriber Line (DSL) tone does not exist on the twisted pair connected to said Broadband modem.

30. The method of claim 24, wherein said detecting step comprises determining that said Broadband modem cannot synchronize with a Digital Subscriber Line Access Multiplexor (DSLAM).

31. The method of claim 24, wherein said detecting step comprises determining that a Permanent Virtual Circuit (PVC) cannot be established from said Broadband modem.

32. The method of claim 24, further comprising, before said detecting step, the step of detecting POTS service.

33. The method of claim 24, further comprising acquiring an identifier from a user of said Broadband modem.

34. The method of claim 24, further comprising, before said establishing step, the step of ascertaining that new information associated with said communication error has not yet been sent to said remote server.

35. The method of claim 24, further comprising, before said establishing step, the step of ascertaining that a Broadband circuit has not been provisioned within a predetermined time.

36. The method of claim 24, wherein said communicating comprises sending information associated with communication error to said remote server, where said information is selected from a group consisting of: a serial number of said Broadband modem, a hardware version of said Broadband modem, a software version of said Broadband modem, an identifier acquired from a user of said Broadband modem, Digital Subscriber Line (DSL) tone information, Digital Subscriber Line Access Multiplexor (DSLAM) connectivity information, Virtual Circuit connectivity information, Internet Protocol connectivity information, and any combination of the aforementioned.

37. The method of claim 24, wherein said communicating comprises:

transmitting a request for configuration details to said remote server via said POTS connection;

receiving said configuration details from said remote server via said POTS connection; and configuring said Broadband modem using said configuration details.

38. The method of claim 37, wherein the request for configuration details is transmitted using DTMF tones and the configuration details are received using DTMF tones.

39. A system for remotely diagnosing a Broadband modem, comprising:

a telephone company central office coupled to both a data network and a Public Switched Telephone Network (PSTN);

a Broadband modem coupled to said telephone company central office via a telephone line, where said Broadband modem is configured to communicate data over said telephone line, the Broadband modem configured to initiate a Plain Old Telephone System (POTS) connection with a remote server and to transmit a communication over the POTS connection, the communication describing a broadband communication error detected when a Broadband circuit cannot be provisioned by the Broadband modem; and wherein the remote server is coupled to said PSTN, and is configured to communicate with said Broadband modem.

40. The system of claim 39, wherein said telephone company central office comprises a Digital Subscriber Line Access Multiplexor (DSLAM) coupled to the data network.

41. The system of claim 40, wherein said telephone company central office further comprises:

another Broadband modem coupled between the DSLAM and the Broadband modem; and a Plain Old Telephone System (POTS) switch coupled to the PSTN.

42. The system of claim 39, wherein said Broadband modem comprises a memory having remote procedures comprising:

Plain Old Telephone System (POTS) dial-tone detection procedures; and

Digital Subscriber Line (DSL) tone detection procedures.

43. The system of claim 39, wherein the Broadband modem comprises DSL service configuration procedures having:

Digital Subscriber Line Access Multiplexor (DSLAM) synchronization procedures;

Permanent Virtual Circuit (PVC) connectivity procedures; and

Internet Protocol (IP) connectivity procedures.

44. The system of claim 39, wherein said Broadband modem comprises a Web-server and Web-pages.

45. The system of claim 39, wherein said remote server comprises a memory having remote procedures including Automatic Number Identification (ANI) detection procedures.

46. The system of claim 39, wherein said remote server comprises a memory having a user database including previous remote session data.

47. The system of claim 39, wherein said remote server comprises a memory having user details.

* * * * *